(12) United States Patent
Abraham

(10) Patent No.: US 10,383,386 B2
(45) Date of Patent: Aug. 20, 2019

(54) UNIVERSAL PROTECTIVE HEADGEAR

(71) Applicant: Carl J. Abraham, Great Neck, NY (US)

(72) Inventor: Carl J. Abraham, Great Neck, NY (US)

(*) Notice: Subject to any disclaimer, the term of this patent is extended or adjusted under 35 U.S.C. 154(b) by 0 days.

(21) Appl. No.: 16/190,781

(22) Filed: Nov. 14, 2018

(65) Prior Publication Data

US 2019/0075878 A1    Mar. 14, 2019

Related U.S. Application Data

(63) Continuation-in-part of application No. 15/496,844, filed on Apr. 25, 2017, which is a continuation-in-part
(Continued)

(51) Int. Cl.
*A42B 3/00* (2006.01)
*A42B 3/12* (2006.01)
(Continued)

(52) U.S. Cl.
CPC .............. *A42B 3/125* (2013.01); *A41D 13/05* (2013.01); *A41D 20/00* (2013.01); *A42B 1/08* (2013.01); *A42C 5/02* (2013.01); *A63B 71/10* (2013.01); *B32B 3/266* (2013.01); *B32B 5/026* (2013.01); *B32B 25/042* (2013.01); *B32B 25/10* (2013.01); *A41D 2300/32* (2013.01); *A41D 2400/20* (2013.01); *A41D 2400/60* (2013.01); *A41D 2500/10* (2013.01); *A41D 2600/10* (2013.01); *B32B 2262/0215* (2013.01); *B32B 2266/0207* (2013.01); *B32B 2307/536* (2013.01); *B32B 2307/726* (2013.01); *B32B 2437/00* (2013.01); *B32B 2571/00* (2013.01)

(58) Field of Classification Search
CPC .... A42B 3/00; A42B 3/06; A42B 3/12; A42B 3/127; A42B 3/105; A42B 3/128
USPC ..................................... 2/411, 415
See application file for complete search history.

(56) References Cited

U.S. PATENT DOCUMENTS 5,963,989 A * 10/1999 Robertson .............. A41D 20/00
                                                            2/171
6,625,820 B1 * 9/2003 Lampe .................... A42B 3/00
                                                            2/171
(Continued)

*Primary Examiner* — Timothy K Trieu
(74) *Attorney, Agent, or Firm* — Robert M. Downey, P.A.

(57) ABSTRACT

A universal combination sweatband, headband, and protective headgear device covers and protects crucial areas around the entire circumference of a user's head while conforming to each user's particular anatomy, including head shape and size. Two or more layers of impact absorbing elastomeric polymer materials having full elastic memory are encapsulated on either the inside or the external part of the headgear, between inner and outer layers of moisture absorbing material, such as neoprene or cotton knitted fabric. Hook and loop fasteners or stretching allow for adjusted fitting to the user's head. The elastomeric polymer layers are structured and disposed to absorb and dissipate significant impact forces. The two or more layers of elastomeric polymeric materials are provided with an arrangement of ventilation holes formed therethrough to allow perspiration to be transferred from the inner layer to the outer layer of moisture absorbing material for dissipation.

12 Claims, 10 Drawing Sheets

Related U.S. Application Data of application No. 14/677,540, filed on Apr. 2, 2015, now abandoned.

(51) Int. Cl.
| | | |
|---|---|---|
| *A41D 20/00* | (2006.01) | |
| *A41D 13/05* | (2006.01) | |
| *B32B 3/26* | (2006.01) | |
| *B32B 25/04* | (2006.01) | |
| *B32B 5/02* | (2006.01) | |
| *B32B 25/10* | (2006.01) | |
| *A63B 71/10* | (2006.01) | |
| *A42B 1/08* | (2006.01) | |
| *A42C 5/02* | (2006.01) | |

(56) References Cited

U.S. PATENT DOCUMENTS

| | | | |
|---|---|---|---|
| 7,992,223 B2 * | 8/2011 | Manzo | A41D 20/00 2/171 |
| 8,613,114 B1 * | 12/2013 | Olivares Velasco | A42B 3/125 2/411 |
| 10,080,394 B2 * | 9/2018 | Johnston | A41D 20/00 |
| 2016/0302500 A1 * | 10/2016 | Johnston | A41D 20/00 |

* cited by examiner

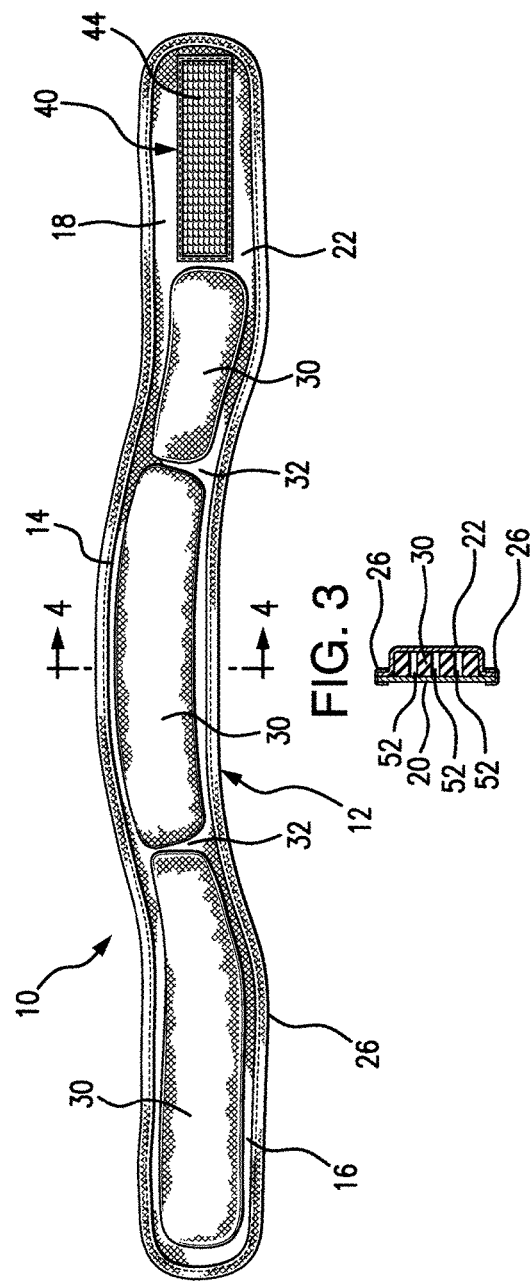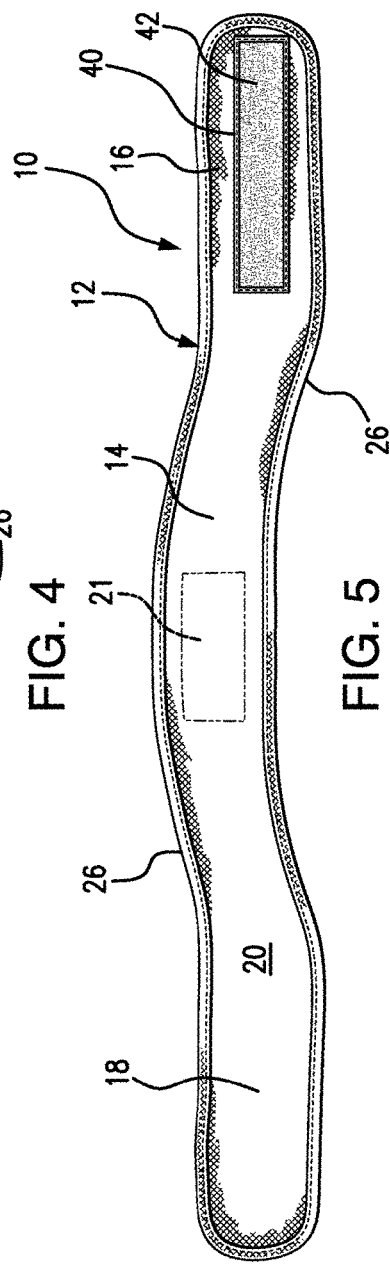

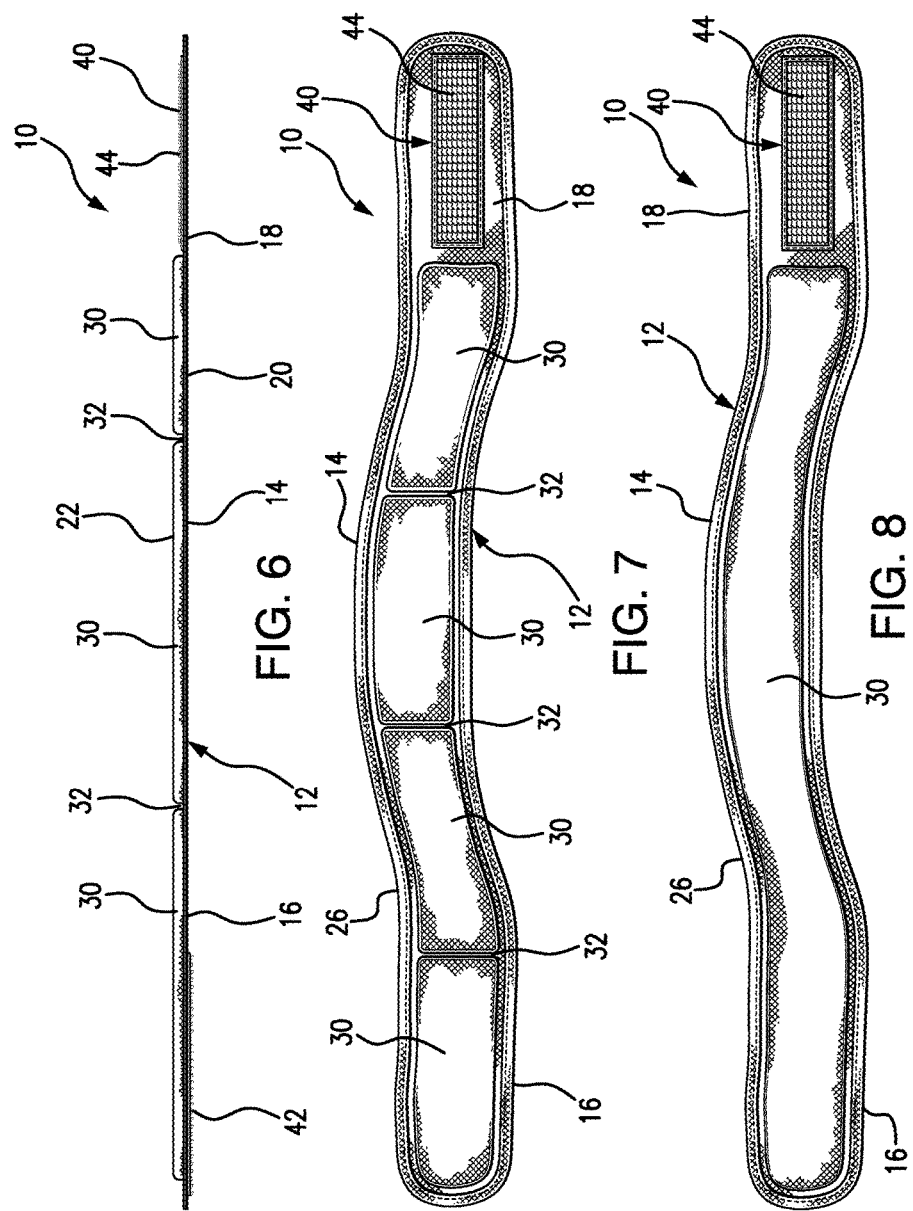

UNIVERSAL PROTECTIVE HEADGEAR

This patent application is a Continuation-In-Part (CIP) of non-provisional patent application Ser. No. 15/496,844 filed on Apr. 25, 2017, which is a CIP of co-pending patent application Ser. No. 14/677,540 filed on Apr. 2, 2015, now abandoned.

BACKGROUND OF THE INVENTION

Field of the Invention

The present invention relates to protective headgear for contact sports, recreational activities and other activities for seniors, toddlers, handicapped and challenged children and adults, and more particularly to a combination universal sweatband, headband and protective headgear that extends around the circumference of the head and absorbs and dissipates significant impact forces to the head and brain and that also absorbs and dissipates a significant amount of perspiration.

Discussion of the Related Art

Head and brain injuries from forces of impact are an unfortunate but common occurrence in a wide variety of contact sports, as well as in the daily routines of young children, toddlers learning to walk and in playgrounds, adults, seniors, the elderly and challenged and handicapped individuals. While head injuries cannot be entirely eliminated, the number and severity of injuries can be significantly reduced with the use of the universal protective headgear. The Center for Disease Control (CDC) reported that falls of seniors in nursing homes and assisted living facilities have become an epidemic.

Numerous innovations for head protective devices have been provided in the prior art, including those devices disclosed in my prior U.S. Pat. Nos. 7,234,174; 6,978,487; 6,675,395; and 6,272,692. Many of the protective headgear devices in the prior art resemble helmets that extend over the top of the head and, while suitable for the purpose of providing some protection, there are shortcomings of the prior art devices which the present invention overcomes. For instance, many prior art headgear devices use padding materials that do not provide complete elastic memory. Thus, their ability to consistently absorb impact and dissipate significant impact forces is diminished. The various head protective devices in the prior art are designed to cover areas of the head that have a low level of risk for injury due to impact forces, resulting in cumbersome, oversized headgear devices that are hot, unsightly and difficult to wash. Moreover, headgear that resembles a helmet presents a negative stigma and many individuals, including athletes, are reluctant to such cumbersome and less attractive devices. In certain sports, athletes are concerned about presenting and maintaining a tough or macho image. While they will wear protective headgear that looks and acts like a sweatband, many of these "macho" athletes refuse to wear helmets or other protective headgear that is not stylish or that is not considered "cool."

The present invention seeks to overcome the problems, limitations and negative stigma of the prior art headgear devices. The present invention provides the first universal protective headgear that can be applied to a wide variety of sports, recreational activities, cheerleading, the elderly prone to falling, veterans that have traumatic brain injuries (TBI), children on playgrounds, children learning to walk, and challenged children. Specifically, the present invention provides a stylish, highly functional and extremely effective universal protective headgear device that is lightweight, ventilated and adjustable and which includes full memory polymeric absorbing material offering increased protection at crucial impact zones around the entire circumference of the user's cranium, including at the forehead, temporal regions and the back of the head.

Precise positioning and placement of protective headgear is critical in reducing significant impact forces to the head that could cause head and brain injuries. Providing protection at the areas of the head that are at the highest level of risk for injury is particularly important with regard to children playing sports whose brains are still developing. For instance, children running around a playing field while participating in a contact sport can hit their heads together, get kicked in the head, have their heads hit to the ground or come into contact with a goal post. They may also be inadvertently hit in the head with an object, such as ball in field hockey or a puck in floor hockey. In addition, heading the ball in soccer exposes the player to sub-concussive and concussive impacts. All of these impact forces to the head and brain are significantly reduced with the use of the universal protective headgear of the present invention. The risk of head and brain injuries from such impact forces necessitates use of the universal headgear which provides a lightweight and non-burdensome means to absorb and dissipate a substantial portion of the significant impact forces associated with collisions and other impacts to the head and brain areas.

In the past twenty years, cheerleading (including "competitive cheer"), which is now considered a contact sporting activity, has evolved into a highly physical sport of tumbling, flying through the air and building tall human pyramids. Cheerleaders perform these dangerous acrobatics without the use of any body armor or protective headgear. Not surprisingly, thousands of cheerleaders are injured each year from falls and collisions while performing various acrobatic maneuvers. In fact, the Consumer Product Safety Commission recently reported that there were almost 37,000 emergency room visits for cheerleading injuries among girls aged 6-22 in just the course of one year. Cheerleading poses by far the greatest risk of catastrophic injury to young female participants of any sport. The American Academy of Pediatrics reported that, between the years 1982 and 2009, cheerleading accounted for 65% of all direct catastrophic injuries to girl athletes at the high school level and 70% at the college level. Many of these catastrophic injuries involve closed-head injuries and skull fractures. Accordingly, there is an urgent need to provide protective headgear for cheerleaders that significantly lowers the risk of the severity of significant impact forces to the head and brain areas, while also being lightweight, stylish and matching the color and design of cheerleader uniforms.

As noted above, children are particularly susceptible to head injuries. In particular, toddlers and young children learning to walk and children on playgrounds are extremely vulnerable to banging their head on the ground or into other objects. Challenged children and autistic children are also at risk for head injuries and may intentionally hit their head against a wall or other object. In some instances, these impacts to children's heads can be severe and have long lasting effects, possibly resulting in permanent brain damage or death. Dwarfs learning to walk are also at significant risk to head injuries. Because dwarfs' heads are large and throw the rest of the child's body off balance, they find it difficult to learn to walk. Until the development of the present invention, dwarfs have had no other option but to wear helmet while learning to walk. Accordingly, there is an urgent need for a universal protective headgear product that can be worn by all children, doing all types of activities, in order to provide protection that lowers the risk of the severity of significant impact forces to the head and brain areas.

Veterans with traumatic brain injuries in hospitals and elderly persons in nursing homes are also vulnerable to hitting their head against walls, doors, the floor and other objects. This may be the result of a loss of balance, neurological disorders or other debilitating conditions or events (e.g., tripping on curbs or other objects) that result in impacts to the head. Accordingly, there remains an urgent and definite need to protect veterans in hospitals, and elderly persons in nursing homes from head injuries by providing a universal headgear product that lowers the risk of the severity of significant impact forces to the head and brain areas.

The universal protective headgear of the present invention serves to provide protection that lowers the risk of the severity of the impact force to the head and brain, while also functioning as a sweatband that absorbs perspiration. The complete structure of the headgear has consistent memory throughout its length, while also being structured and disposed to provide an appropriate level of ventilation and breathing, thereby reducing heat between the headband and the user's head. The universal headgear of the present invention may be manufactured in a variety of sizes, widths, thicknesses, and degrees of curvature to suit the needs of the particular user, as well as to conform to the circumference and contour of the anatomy of a particular user's head.

SUMMARY OF THE INVENTION

The present invention is directed to a universal headgear device for protecting those areas of the head that are at the highest level of risk of injury from forces of impact.

The invention has been developed and tested to be in full compliance with ASTM (American Society of Testing and Materials), ANSI (American National Standards Institute), FIFA (Federation Internationale de Football Association), the National Federation of High School Associations and the European CE II requirements, designating the product as a "Protective Headband" as a result of independent testing.

The universal protective headgear of the present invention includes an elongated headband formed of neoprene or other elastomeric polymeric materials that have similar properties to neoprene. Alternatively, the headband may be formed of a knitted fabric, similar to the fabric commonly used for manufacturing sweatbands. In a preferred embodiment, the knitted fabric is a close-knit fabric consisting of 85% cotton and 15% SPANDEX having a needle count per square inch ranging between 262 to 295, and ideally a needle count per square inch of 288. The thread thickness is 32S denier. The elongate headband has opposite end portions and a central portion. The headband is sized, structured and configured to wrap around a user's head to cover and protect crucial areas around the entire circumference of the cranium. An impact absorbing polymeric material having full elastic memory is encapsulated between inner and outer layers of neoprene on the inside and/or the external side of the headband. The hardness of the polymeric material is selected depending upon the amount of absorption and dissipation required for a specific activity. Hook and loop fasteners on the opposite end portions allow for adjusted fitting of the headband to the user's head. The polymeric material is specifically positioned to allow the headband to easily wrap around and conform to the user's head and is structured and disposed to absorb and dissipate significant impact forces, thereby providing increased protection to areas around the user's entire head that are at the highest level of risk of injury from forces of impact, including at the forehead and at the back of the head. The knitted headband is manufactured tightly so that it can stretch around the circumference of the user up to 6-inches and comes in several sizes to accommodate the circumference of the head of toddlers, young children, teenagers, and adults.

In a preferred embodiment, the polymeric material comprises one or more layers of elastomeric polymers. If only one layer of elastic polymers exits, the thickness is approximately one quarter to three eighths of an inch thick with a Shore A hardness ranging from 25-55. If more than one layer, the inside layer (i.e., towards the user's head) is the softer layer ranging in thickness from 0.05 inches to 0.25 inches. The outer layer ranges from 0.125 inches to 0.3 inches in thickness. The hardness of the inner layer can range from a Shore A hardness of 20-55 and the outside layer can range from a Shore A hardness of 35-55. The testing of the products for soccer in accordance with ASTM F2439 (Standard Specification for Headgear Used in Soccer), as an example, results in readings of 60 to 70 G's when exposed to heat (116 degrees Fahrenheit), saturated in water, cold (0 degrees Fahrenheit) and room temperatures. The passing results must be under 80 G's.

The two or more layers of polymeric material may be selected from any of the following:
Polyurethanes
Polyethylene Terephtalate (PET)
Polyethyleneoxide (PEO)
Polystyrene
Poly (1,4-butadiene)
Polytetrahydrofuran
Ethylene-vinyl acetate copolymer
Synthetic polyisoprene
Polybutadiene
Styrene-butadiene rubber
Silicon rubber The universal protective headgear of the present invention is useful in a wide variety of sports, recreational activities and other activities and environments for both children and adults including, but not limited to, the following:
Soccer
Curling
Basketball
Women's Lacrosse
Women's Field Hockey
Volleyball
Cheerleading
Flag Football
Floor Hockey
Figure Skating
Under the helmet of Jockeys and Equestrian Riders
Under a goal tenders mask in Ice Hockey
Hiking
Children and Dwarfs Learning to Walk
Toddlers learning to walk
Children on Playgrounds
Autistic Children that are prone to hit their head against the wall
Challenged Children
Handicapped Children
Veterans that have traumatic brain injuries (TBI)
Elderly that are prone to falls Elderly in Nursing Homes
Seniors suffering leg weakness
Seniors prone to falling
Seniors assisted by a walker
Seniors using a cane
Seniors going up and down stairs
Seniors exercising
Seniors in rehabilitation
Seniors suffering from vertigo

OBJECTS AND ADVANTAGES OF THE INVENTION

Considering the forgoing, it is a primary object of the present invention to provide a universal protective headgear product that is sized, structured and configured to cover areas of the head that are at the highest level of risk of injury from exposure to impact forces and that has universal application for a wide variety of sports, recreational activities, cheerleading, nursing homes, playgrounds, veterans in hospitals and challenged children, and wherein the headgear is structured and disposed to absorb and dissipate significant impact forces to the head.

It is a further object of the present invention to provide a universal protective headgear product that adjustably fits around and conforms to the entire circumference of the user's head and which includes one or more compressible inserts (pads) having full elastic memory that also breathes, using a unique design by applying predetermined die cut holes throughout the polymer that allows the perspiration to flow through the headband to the outside.

It is a further object of the present invention to provide a universal protective headgear product that includes one or more layers of impact absorbing elastomeric polymer materials having full elastic memory that are encapsulated on either the inside or the external part of the headgear.

It is a further object of the present invention to provide a protective stylish headband that resembles a typical sweatband, while also providing significant reduction in the risk of head and brain injuries by protecting the areas of the head that are at the highest level of risk, while appealing to even the most "macho" athletes, and all the other segments of our population who will be using the universal protective headband of the present invention.

It is still a further object of the present invention to provide a universal protective headgear product that is stylish, lightweight, adjustable to fit all head sizes, and that maintains its integrity while in place around the circumference of the user's head.

It is still a further object of the present invention to provide a universal protective headgear device in the form of a headband that absorbs perspiration and which is formed of breathable materials, thereby maintaining the user's head cool and comfortable, while also significantly reducing the severity of impact forces to the brain.

It is still a further object of the present invention to provide a protective headgear device that is easily washed in a sink with tap water and hand soap.

It is yet a further object of the present invention to provide a universal headgear device in the form of an elongate headband that can be manufactured in a variety of colors and designs in order to match the décor of uniforms and/or equipment worn by the user.

It is still a further object of the present invention to provide a protective headband that provides for an area for placement of team and/or brand names and logos.

These and other objects and advantages of the present invention are more readily apparent with reference to the following detailed description taken in conjunction with the accompanying drawings.

BRIEF DESCRIPTION OF THE DRAWINGS

For a fuller understanding of the nature of the present invention, reference should be made to the following detailed description taken in conjunction with the accompanying drawings in which:

FIG. 3 is a bottom plan view of one embodiment of the universal protective headgear of the present invention, showing the inner facing side of the headband with three separate pads of polymeric material secured under a liner on the inner facing side of the headband;

FIG. 4 is a cross sectional view taken along the plane of the line indicated by the arrows 4-4 in FIG. 3;

FIG. 5 is a top plan view of the one embodiment of the universal protective headgear of the present invention showing the outer facing side of the headband when stretched out and laid flat;

FIG. 6 is a side elevational view of the headband shown in FIGS. 3 and 5 illustrating the three separate polymeric pads protruding on the inner facing side and hook and loop fasteners at opposite ends of the headband;

FIG. 7 is a bottom plan view of another embodiment of the universal protective headgear of the present invention showing an alternative configuration and placement of the impact absorbing polymeric pads;

FIG. 8 is a bottom plan view of the universal protective headgear of the present invention, showing yet another embodiment of the invention using a single impact absorbing polymeric pad extending along the entire length of the protection area of the headband;

Like reference numerals refer to like parts throughout the several views of the drawings.

DETAILED DESCRIPTION OF THE PREFERRED EMBODIMENTS

Figure 1:
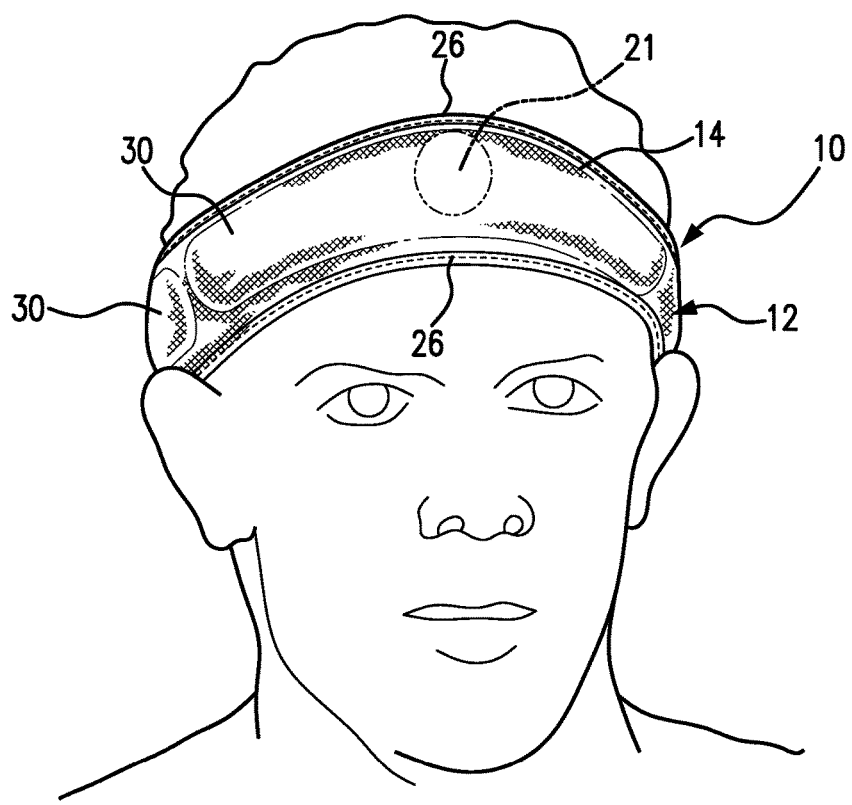
FIG. 1 is a perspective view showing one embodiment of the universal protective headgear of the present invention worn on an adult's head.
Figure 2A:
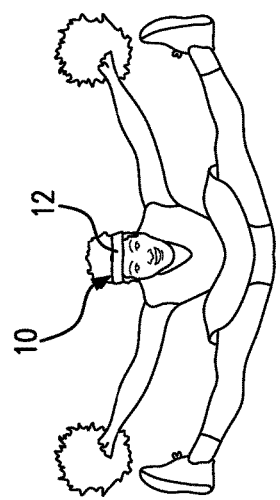
FIGS. 2A-2D show examples of use of the universal headgear by participants in various contact sports, such as cheerleading, soccer, flag football and women's lacrosse.
Figure 2B:
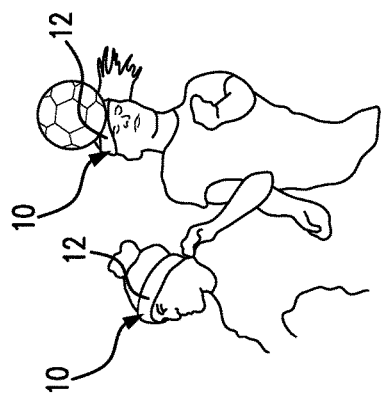
Figure 2C:
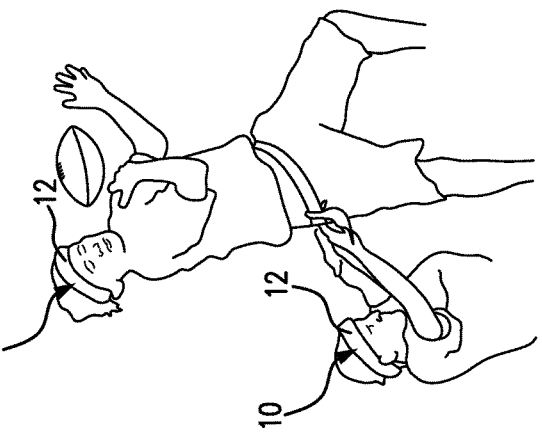
Figure 2D:
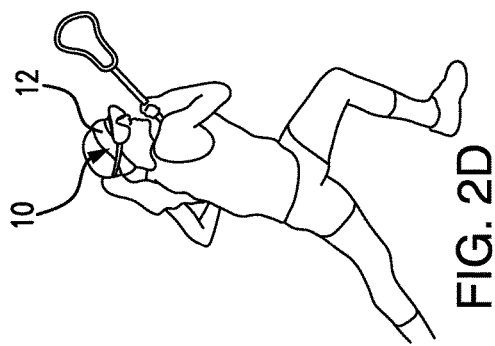
Figure 9:
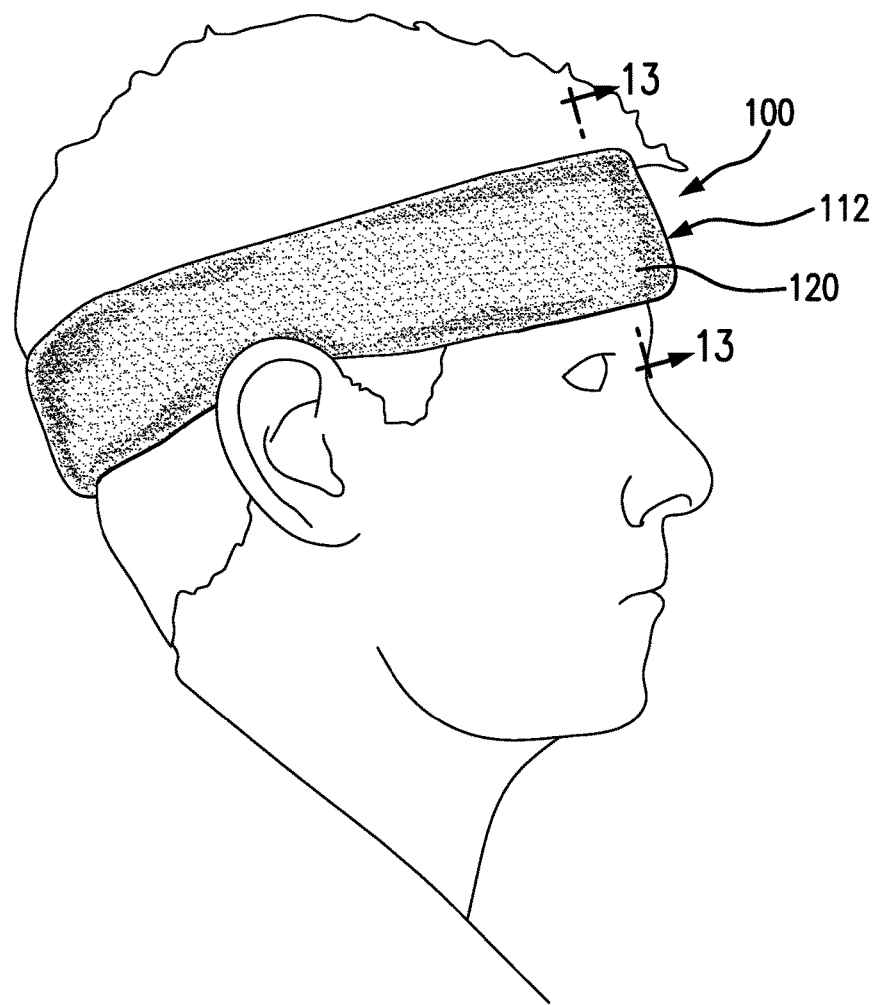
FIG. 9 is a side elevational view of a further embodiment of the universal protective headgear of the present invention worn on an adult's head, wherein the universal protective headgear includes a headband formed in a continuous and endless loop that fits onto the user's head, as shown, and the headband being formed of a stretchable knitted fabric.

Referring to the several views of the drawings, and initially FIGS. 1 and 2A-2D, a first embodiment of the universal protective headgear 10 of the present invention is shown on several users' heads participating in various sports. The universal protective headgear 10 is defined primarily by an elongate headband 12 that resembles and functions as a sweatband. When properly worn, as shown in FIGS. 1 and 2A-2D, the headband 12 extends around the entire circumference of the user's head and substantially covers the forehead, left and right temporal regions and the back of the head, covering those areas where there is the highest level of risk to head and brain injuries from forces of impact. The universal headgear 10 is structured to be fully compressible and provides full elastic memory. The headgear includes one or more layers formed of impact absorbing polymers 30. When the headgear is properly worn, the impact absorbing polymeric layers 30 are positioned in covering, protective relation to those high risk areas, around the entire circumference of the user's head. The hardness of the polymeric layers can be varied depending upon the amount of absorption and dissipation required for a particular sport or activity in full compliance with existing ASTM standards, FIFA, the National Federation of High School Associations and the European CE II standard designating the product as "protective headgear" after independent testing. In a preferred embodiment, the polymeric material layers 30 have a Shore A hardness in the range of between 20-55, as measured by a Shore A durometer. For example, when the headgear is intended for an infant, the Shore A hardness of the polymeric material layers 30 may range between 20-55. This is considering the fact that if an infant should fall, the distance to the ground is significantly less than the distance experienced by an adult when falling to the ground. Therefor, the hardness of the polymeric layers 30 would be different for infants as compared to children and adults. When the headgear is used for children ages 6-10 playing soccer, for example, the Shore A hardness of the polymeric material layers 30 would range between 20-45. For teenagers involved in sports such as soccer, flag football and basketball, for example, the Shore A hardness of the polymeric material layers 30 would range between 20-45. For adults playing soccer or basketball, for example, the Shore A hardness of the polymeric material layers 30 would range between 25-65.

Referring to FIGS. 3-8, several embodiments of the universal protective headgear 10 are shown. In each of these embodiments, the headband 12 includes a central zone 14, a first distal end zone 16 and a second distal end zone 18 on the opposite side of the central zone 14. Each of the first and second distal end zones 16, 18 extend from the central zone to the respective opposite distal ends of the headband 12.

As seen in FIG. 4, the one or more layers of impact absorbing polymeric material 30 include an arrangement of ventilation holes 52 that are spaced equally throughout the one or more layers 30, with the ventilation holes 52 extending through an entire thickness of the one or more layers of polymeric materials. The diameter of the holes 52 may range between $1/32$ of an inch diameter to $1/8$ inch in diameter. In a preferred embodiment, the ventilation holes 52 have a diameter of $1/16$ of an inch. The ventilation holes 52 are equally spaced apart and, in a preferred embodiment, the holes are spaced between $1/4$ of an inch apart to $3/8$ of an inch apart, consistent throughout. For infants and children that do not sweat as much, the holes 52 can be spaced $3/8$ of an inch apart. For teenagers and adults, the spacing of the ventilation holes 52 can be $1/4$ of an inch apart. In this instance, the ventilation holes 52 are closer together because teenagers and adults tend to sweat more and need more ventilation to allow transfer of perspiration from the inner moisture absorbing layer of the headgear to the outer moisture absorbing layer of the headgear as described in more detail hereinafter. When the one or more layers of polymeric material flex or bend, the ventilation holes 52 remain the same size and do not expand or enlarge, thereby maintaining the integrity of the one or more layers of polymeric materials for absorbing and dissipating impact forces.

As seen in FIGS. 3-8, the construction of the universal protective headgear 10 includes an outer facing material band 20 formed of an elastomeric polymeric material, such as neoprene or other elastomeric polymers that have similar properties, and an inner facing layer of material 22 formed of an elastomeric material, such as neoprene or similar elastomeric polymeric material. In one embodiment, the inner facing layer of material 22 is lighter in weight (i.e., thinner) compared to the outer layer of material 20. The inner facing layer of material 22 may include an arrangement of holes or apertures to enhance transfer of perspiration from the user's skin and through the holes of the inner layer, as well as the ventilation holes in the impact absorbing polymeric material inserts and to the outer layer for absorption and dissipation of perspiration. The outer facing surface of the outer layer 20 may be provided with one or more areas 21 for placement of team or brand names and/or logos.

In a preferred embodiment, the inner facing layer of material 22 is tightly fitted about the one or more layers of polymeric material inserts 30 and against an inner side of the outer layer of material 20 so as to firmly and snugly hold the polymeric inserts in fixed position on the headband 12. A stitched rib of material 26 extends about the entire periphery of the headband 12 and joins the outer material layer 20 with the inner material layer 22. The stitched rib 26 may be formed of an elastomeric material, similar to the outer and inner layers, and preferably of a thickness that is equal to or similar to the inner material layer 22. As seen in FIGS. 3 and 5-8, the rib 26 is stitched on both sides of the headband to secure the inner and outer layers together. While thread stitching is shown, in accordance with a preferred embodiment, it is recognized that the periphery of the inner and outer layers may be joined together by other means, such as by gluing, heat sealing or other suitable means of attachment.

The embodiments shown in FIGS. 3-6 and 7 provide for multiple impact absorbing polymeric material inserts 30 that are positioned side by side along a substantial length of the headband. Small spaces or gaps 32 between each of the adjacently positioned polymeric inserts 30 promote flexing of the headband 12 so that the headband 12 can be wrapped around and conform to the contour of the wearer's head, with the headgear 10 providing consistent and full elastic memory throughout the entire length of the headband 12 and around the entire circumference of the wearer's head.

The embodiment shown in FIG. 8 provides for a single impact absorbing polymeric insert 30 that extends substantially along the length of the protection area of the headband 12, providing complete and consistent elastic memory throughout the entire length of the headband 12.

In each of the embodiments shown in FIGS. 3-8, the opposite first and second distal end zones 16, 18 are provided with releasable fasteners for adjustably securing the headband around the user's head so that the headband fits snug (i.e., without slipping), but not too tight. In a preferred embodiment, the releasable fasteners at the opposite first and second distal end zones are hook and loop fasteners. However, it is fully contemplated within the spirit and scope of the invention to provide other types of releasable and adjustable fasteners, such as, but not limited to, snaps or buttons. Alternatively, the ends of the headband may be permanently affixed to one another so that the headband is a continuous and endless loop that is able to stretch and conform to the size and shape of the wearer's head, such as in the embodiment shown in FIGS. 9-14 described hereinafter.

The hook and loop releasable fasteners shown throughout the several views of the drawings include a loop component 42 on the outer facing side of the first distal end zone 16 and a hook component 44 on an inner facing side of the second distal end zone 18.

As seen in FIGS. 3, 5 and 7-8, the central zone 14 of the headband has a curved configuration relative to the opposite first and second distal end zones 16 and 18. This curved configuration allows the headband to properly conform to the wearer's head, when wrapped around the forehead and back of the head, to properly cover the areas of the head that are at the highest level of risk to injury from impact forces. It should be noted that the degree of curvature of the headband, as well as the length of the headband and the width of the headband and the width of the polymeric inserts 30 may be varied to conform with the circumference and anatomical shape of different wearer's heads. Moreover, the materials and structure of the universal headgear 10 provide full elastic memory throughout the entire length of the headband 12 and around the entire circumference of the wearer's head.

Referring to FIGS. 9-14, another embodiment of the universal headgear of the present invention is shown and is generally indicated as 100, wherein the headgear is an endless loop of a stretchable sweatband 112. In this embodiment, the outer facing layer 120 and the inner facing layer 122 are formed of a knitted fabric, such as sweatband material. For example, the knitted fabric may be a close-knit cotton fabric consisting of 85% cotton and 15% SPANDEX and having a needle count per square inch ranging between 262 to 295. In at least one embodiment, the needle count per square inch is 288. In at least one embodiment, the thread thickness is 32S denier. The outer layer 120 and the inner layer 122 are formed of a material that readily absorbs and dissipates moisture, such as perspiration. The one or more layers of impact absorbing polymeric material inserts 130 are positioned between the outer material layer 120 and the inner material layer 122. Similar to the previously described embodiments in FIGS. 3-8, the impact absorbing polymeric material inserts 130 include an arrangement of ventilation holes 152 therethrough to allow airflow through the one or more layers of polymeric material 130 in order to promote dissipation of perspiration that has been absorbed into the exterior or outer layer of material 120 by wicking. More specifically, the ventilation holes 152 through the polymeric materials 130 allow perspiration to travel from the inner facing layer 122, through the holes 152 in the inserts and absorbed into the outer layer of moisture absorbing material 120 where the perspiration can be dissipated by wicking from airflow across the outer surface of the protective headgear 100. Tests were performed on the water absorption capacity of both a sweatband from a major sports apparel manufacturer and the universal protective headband of the present invention shown in FIGS. 9-14. The sweatband from the major sports apparel manufacturer achieved a water absorption capacity of 50%, while the protective headband of the present invention achieved a water absorption capacity of 140% of its original dry weight.

Figure 10:
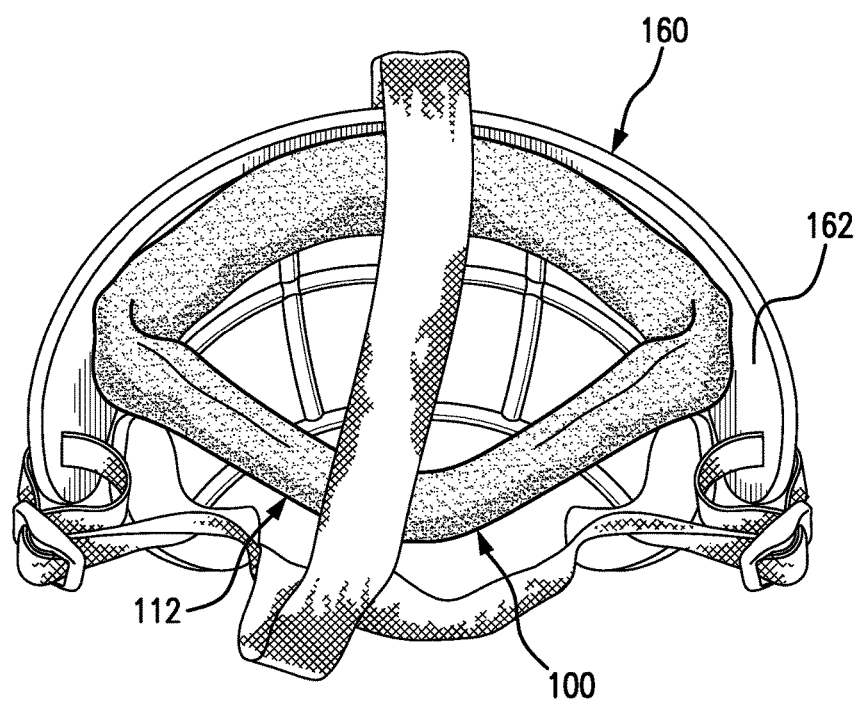
FIG. 10 is a top perspective view showing the universal protective headgear of FIG. 9 fitted within a protective face mask for providing protection against impact to the face mask, such as in the sport of softball.
Figure 11:
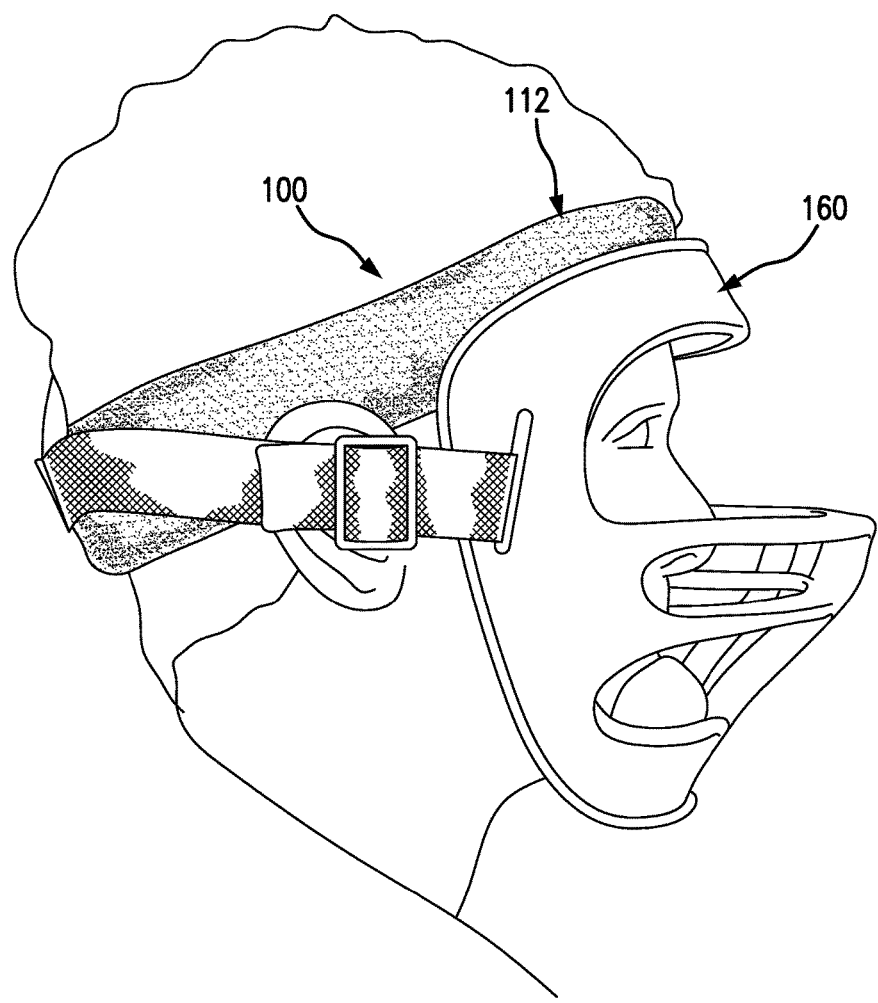
FIG. 11 is a side elevational view showing the universal protective headgear of FIG. 9 worn on the user's head in conjunction with the protective face mask.
Figure 12:
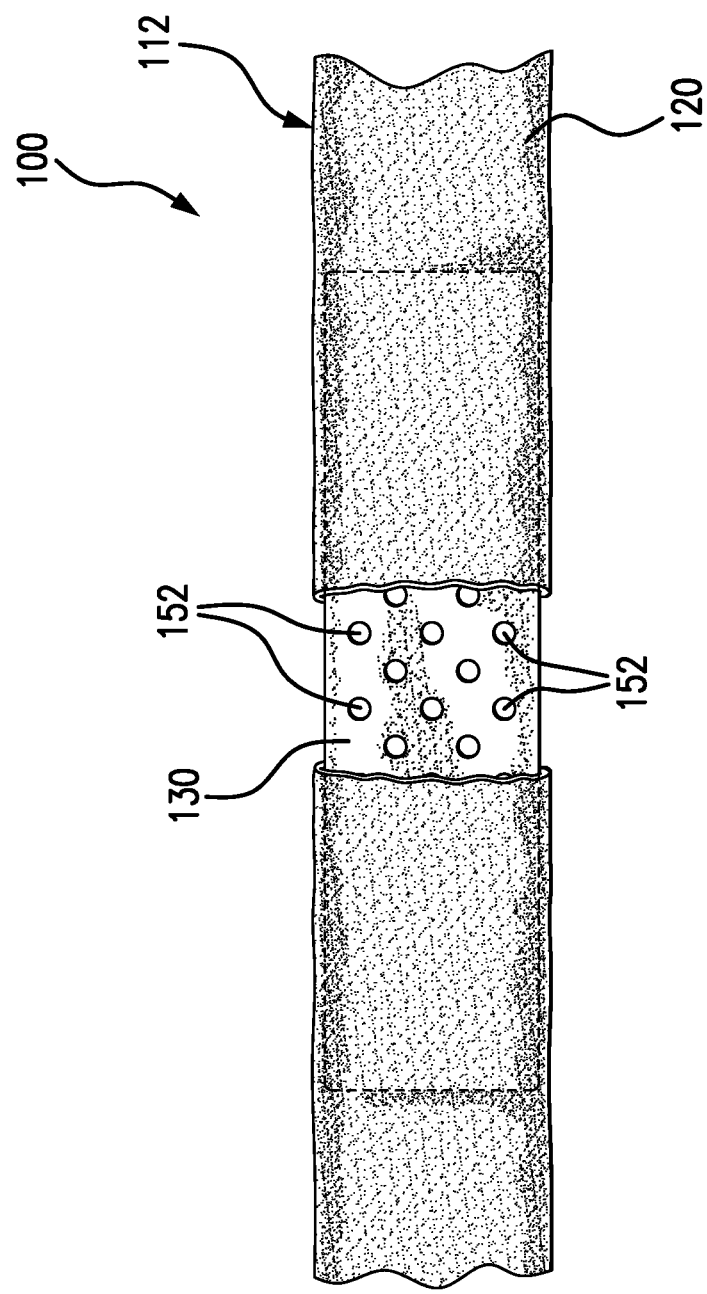
FIG. 12 is an isolated view, shown in cut-away, illustrating the construction of the universal protective headgear of FIG. 9, including an outer and inner layer of close-knit moisture absorbing fabric and an interior impact absorbing polymeric material fitted within the headband between the outer and inner layers of close-knit fabric, and wherein the impact absorbing polymeric material includes an arrangement of ventilation holes formed therethrough.
Figure 13:
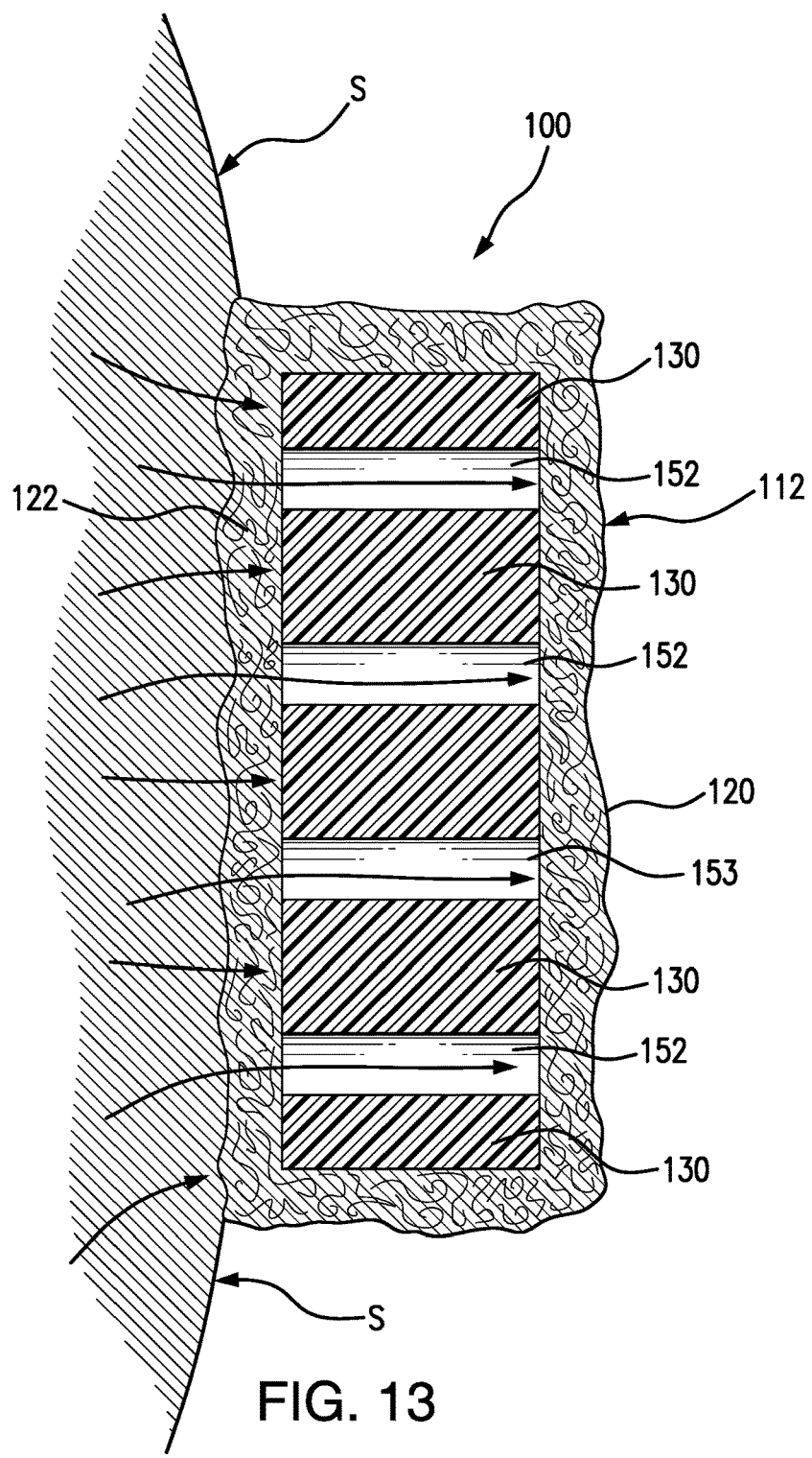
FIG. 13 is a cross sectional view taken along the plane of the line indicated by the arrows 13-13 in FIG. 9.

As seen in FIGS. 10 and 11, the universal protective headgear 100 of the present invention can be worn in conjunction with a protective face mask 160 to absorb and dissipate forces of impact to the face mask while playing various sports, such as softball or baseball. Specifically, the universal protective headgear 100 of the present invention is worn around the circumference of the user's head, as seen in FIG. 11, with the protective headgear being fitted between the inner facing surface of the face mask 162 and the user's head, along the forehead of the user. The inner facing surface 162 of the protective face mask 160 may be provided with a hook component of a hook and loop fastener system, which allows the knitted fabric of the headband of the universal protective headgear 100 to releasably attach to the inner surface 162 of the face mask 160, as seen in FIG. 10. This may help to prevent slipping and undesirable movement of the face mask 160, and particularly the inner surface 162, relative to the outer facing surface of the protective headband 112.

Figure 14:
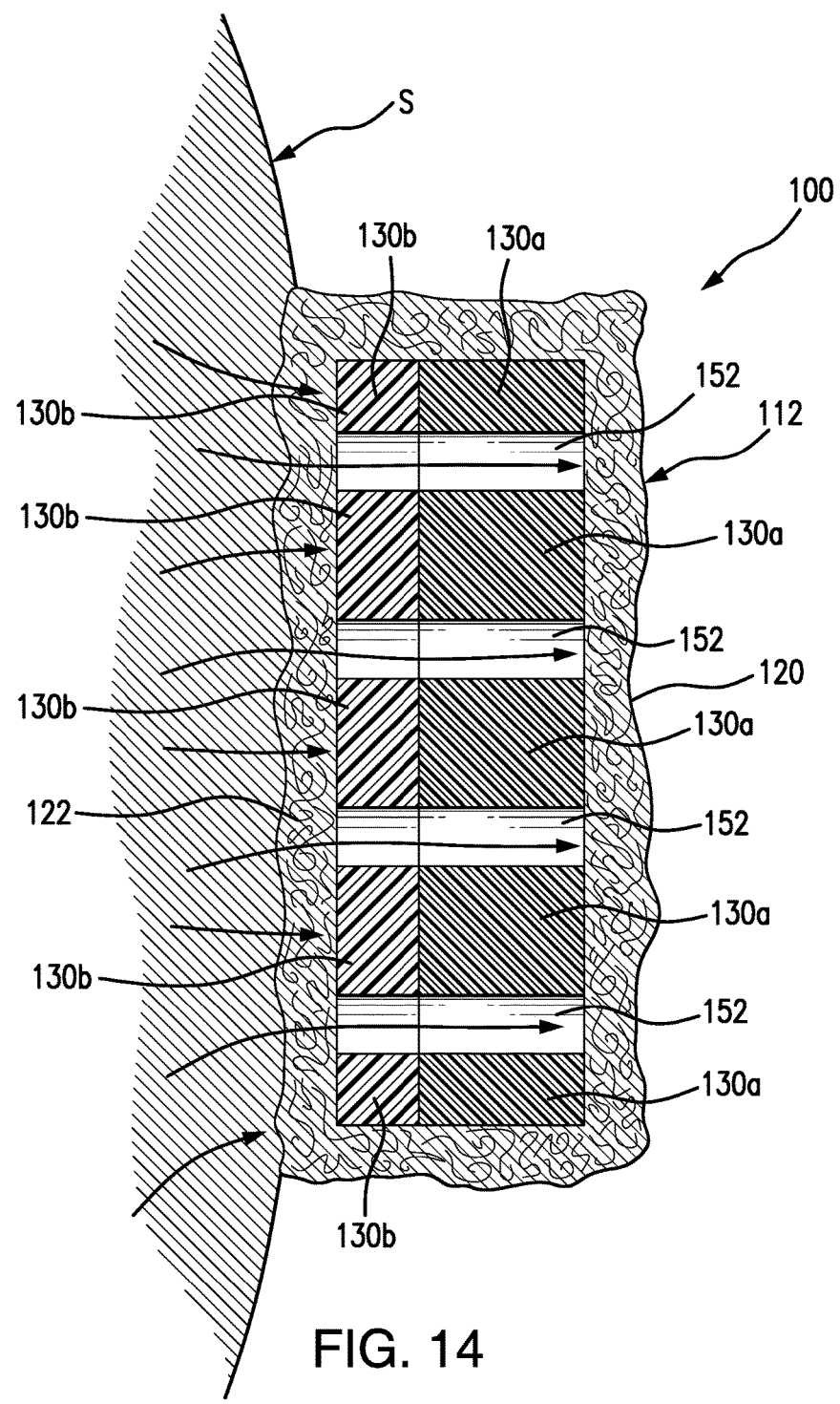
FIG. 14 is a cross sectional view taken along the same plane as FIG. 13, and illustrating an alternative embodiment wherein the impact absorbing polymeric material includes two layers of polymeric material of different degrees of hardness.

FIG. 14 illustrates a further embodiment of the universal protective headgear 100, wherein the headband 112 includes multiple layers of impact absorbing polymeric materials between the outer and inner layers of the headband material. Specifically, as see in FIG. 14, the headband includes an outer layer 130*a* of impact absorbing polymeric material and an inner layer 130*b* of impact absorbing polymeric material. In accordance with one embodiment, the outer layer of impact absorbing polymeric material ranges in thickness from 0.125 inches to 0.3 inches and the inner layer of impact absorbing polymeric material ranges in thickness from 0.05 inches to 0.25 inches. Further, the outer layer 130*a* of impact absorbing polymeric material has a hardness ranging between Shore A 35 and 55, while the inner layer 130*b* of impact absorbing polymeric material has a hardness ranging between Shore A 20 and 40. The multiple layers of impact absorbing polymeric materials 130*a* and 130*b*, each having a different degree of hardness, may enhance the absorption and dissipation of impact forces to the outer facing side of the universal protective headgear 100 when worn on the user's head.

While the present invention has been shown in accordance with several preferred and practical embodiments, it is recognized that departures from the instant disclosure are fully contemplated within the spirit and scope of the present invention which is not to be limited except as defined in the following claims.

What is claimed is:
1. A protective headgear device comprising:
  a headband having an outer layer with an outer facing surface, an inner layer with an inner facing surface, and a central portion, the headband being sized, structured and configured to extend around the entire circumference of a user's head, including across the forehead, through the temporal regions and across the back of the user's head to define an operative position, and the outer layer and the inner layer of the headband being formed of a material that absorbs and dissipates moisture, and the outer layer and the inner layer having a combined liquid absorption capacity of at least 140% of the original dry weight of the headband;

a plurality of layers of impact absorbing polymeric material between the outer layer and the inner layer of the headband, and the plurality of layers of impact absorbing polymeric material being stacked in abutting engagement with one another as a unitary body and positioned to overly and protect areas around the entire circumference of the user's head when the headband is worn in the operative position, and each of the plurality of layers of impact absorbing polymeric material being compressible and having elastic memory capable of resuming original shape after compression, and the plurality of layers of impact absorbing polymeric material including an inner layer having a hardness ranging between Shore A 20 and 40 and an outer layer having a hardness ranging between Shore A 35 and 55, and the plurality of layers of impact absorbing polymeric material being structured and disposed to absorb and dissipate external forces of impact to the outer facing surface when the headband is worn in the operative position on the user's head; and the plurality of players of impact absorbing polymeric material further including an arrangement of equally spaced ventilation holes formed entirely through a combined thickness of the plurality of layers of impact absorbing polymeric material, and the ventilation holes having a diameter ranging between 1/32 of an inch and 1/8 of an inch.

2. The protective headgear device as recited in claim 1 wherein the headband further comprises opposite end portions and releasable fasteners on the opposite end portions of said headband for adjustably fitting and securing the headband snug around the user's head in the operative position.

3. The protective headgear device as recited in claim 2 wherein the releasable fasteners are hook and loop fasteners.

4. The protective headgear device as recited in claim 1 wherein the plurality of layers impact absorbing polymeric are inserted and held in fixed position between the outer and inner layers of the headband.

5. The protective headgear device as recited in claim 4 wherein the outer and inner layers are neoprene.

6. The protective headgear device as recited in claim 4 wherein the outer and inner layers are a knitted fabric.

7. The protective headgear device as recited in claim 6 wherein the knitted fabric is a close-knit fabric consisting of 85% cotton and 15% SPANDEX.

8. The protective headgear device as recited in claim 7 wherein the close-knit fabric has a needle count per square inch ranging between 262 to 295.

9. The protective headgear device as recited in claim 7 wherein the close-knit fabric has a needle count per square inch of 288.

10. The protective headgear device as recited in claim 7 wherein the close-knit fabric has a thread thickness of 32S denier.

11. The protective headgear device as recited in claim 1 wherein the inside layer of impact absorbing polymeric material ranges in thickness from 0.05 inches to 0.25 inches and the outer layer of impact absorbing polymeric material ranges in thickness from 0.125 inches to 0.3 inches.

12. The protective headgear device as recited in claim 1 wherein the headband is stretchable for accommodating a range of different head sizes.

* * * * *